April 17, 1928.　　　　　　　　　　　　　　　　　1,666,559
R. O. DORGAN
AUTOMATIC ELECTRIC RAILROAD CROSSING GATE
Filed April 29, 1927　　　3 Sheets-Sheet 1

INVENTOR.
R. O. Dorgan.
BY
ATTORNEYS.

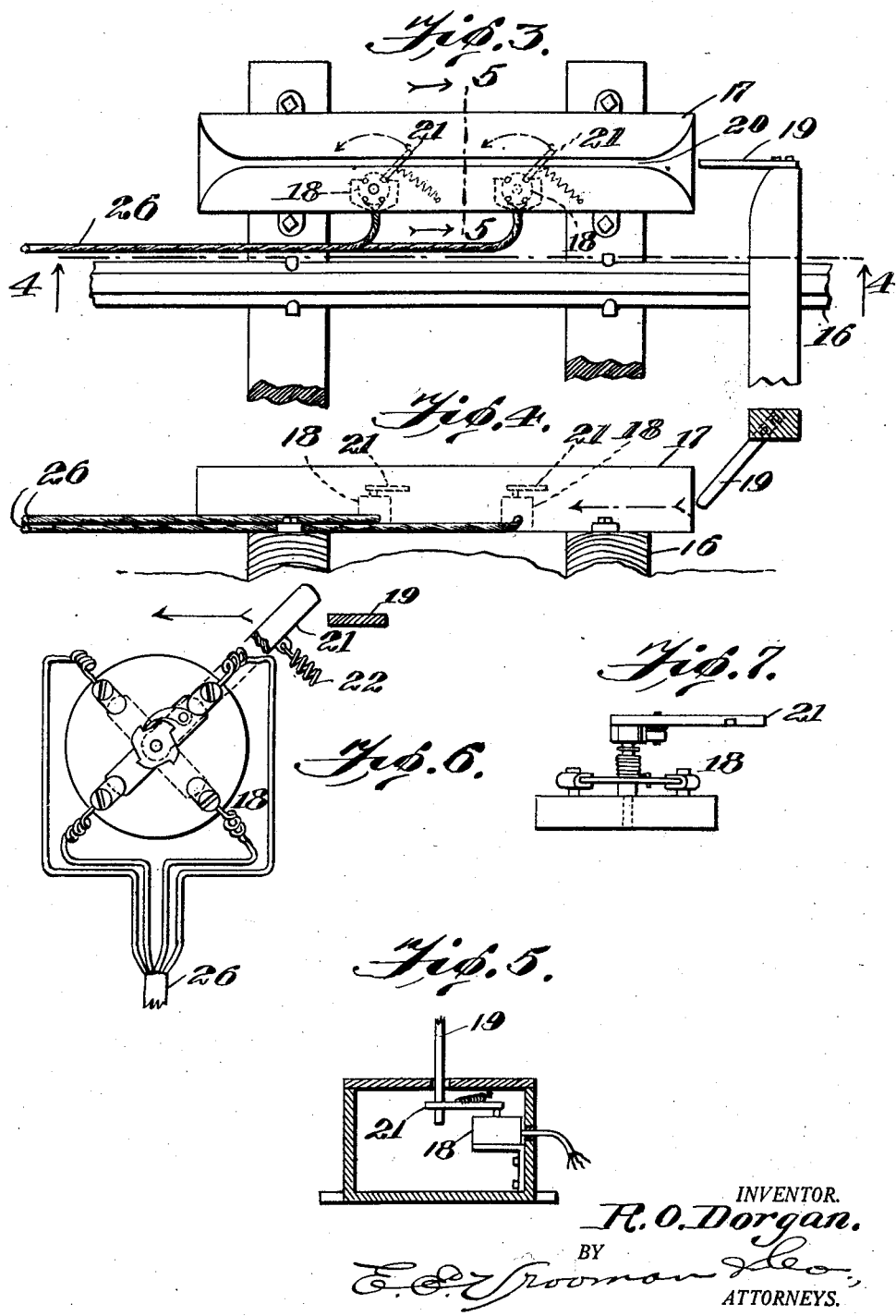

April 17, 1928. 1,666,559
R. O. DORGAN
AUTOMATIC ELECTRIC RAILROAD CROSSING GATE
Filed April 29, 1927 3 Sheets-Sheet 3
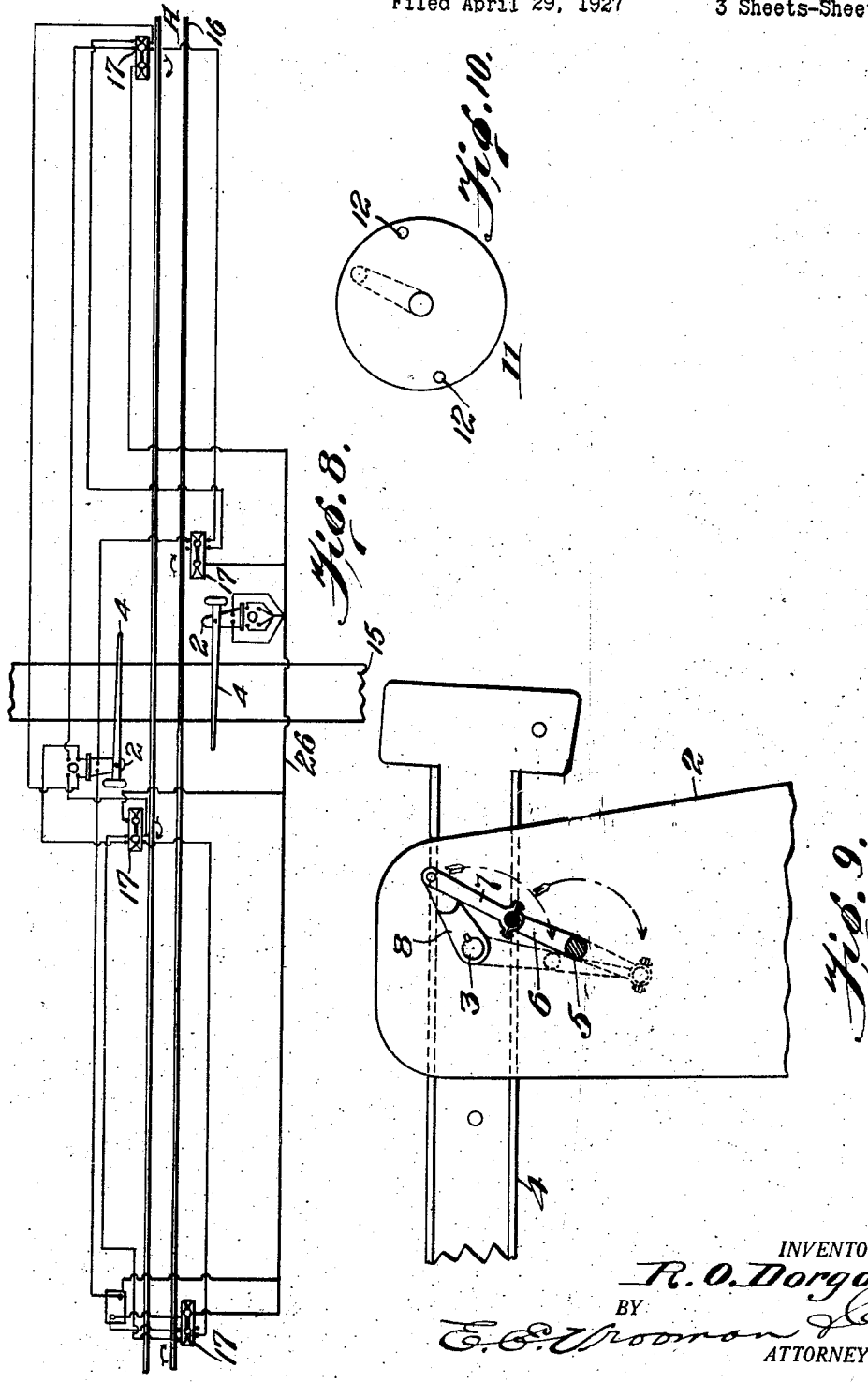
INVENTOR.
R. O. Dorgan
BY
ATTORNEYS.

Patented Apr. 17, 1928.

1,666,559

UNITED STATES PATENT OFFICE.

RALPH O. DORGAN, OF MOBILE, ALABAMA.

AUTOMATIC ELECTRIC RAILROAD-CROSSING GATE.

Application filed April 29, 1927. Serial No. 187,530.

This invention relates to an automatic electric railroad-crossing gate.

The object of the invention is the construction of a simple and efficient electrically operated gate, which will be operated by an approaching train to close the gate, and then when the train or locomotive, passes a given point, the gate will be operated for raising it to an open position.

Another object of the invention is the provision of simple and efficient means for connecting a swinging gate to an electric motor, for operating said gate.

With the foregoing and other objects in view, my invention comprises certain novel constructions, combinations and arrangements of parts as will be hereinafter fully described, illustrated in the accompanying drawings, and more particularly pointed out in the appended claims.

In the drawings:

Figure 3 is an enlarged, fragmentary top plan view of the apparatus, showing the track switches, while Figure 4 is a view in side elevation of the same, taken on line 4—4, Figure 3, and looking in the direction of the arrows.

Figure 5 is a transverse view taken on line 5—5, Figure 3, and looking in the direction of the arrows.

Figure 6 is an enlarged plan view of one of the track switches, while

Figure 7 is a view in side elevation of the same.

Figure 8 is a diagrammatic view of a complete wiring unit, showing the entire hook-up for a single gate.

Figure 9 is a fragmentary, side view of a gate casing and part of the gate operating mechanism.

Figure 10 is a plan view of the disc with the pins extending therefrom.

Figure 2:
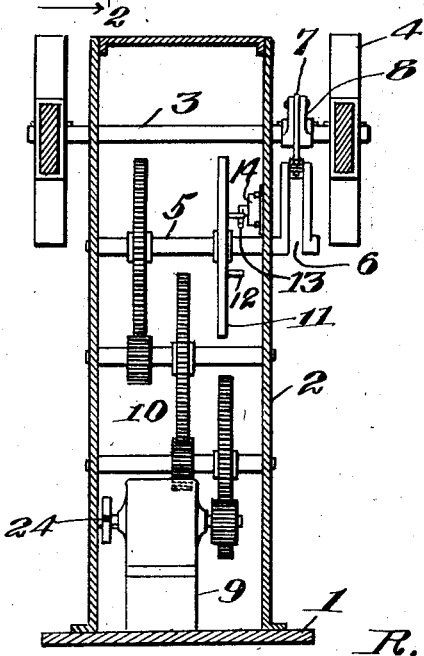
Figure 2 is a sectional view taken on line 2—2, Figure 1, and looking in the direction of the arrows.

Referring to the drawings by numerals, 1 designates the platform upon which rests the gate casing 2. A driven shaft 3 is journalled upon gate casing 2, and fixedly secured to shaft 3 is swinging gate 4. A crank shaft 5 is journalled upon casing 2 below driven shaft 3. This crank shaft 5 is provided outside of the casing 2 with a crank portion 6, to which is secured one end of link 7; the other end of link 7 is pivotally secured within the outer bifurcated end of arm 8. Arm 8 is fixedly secured at its inner end, to driven shaft 3, Fig. 2. A motor 9 is within casing 2, and is connected through a train of gears 10 to the crank shaft 5, so that when the motor is in operation, rotary movement will be imparted to said shaft. A disc 11 is fixedly secured to crank shaft 5 within casing 2, and this disc is provided with two pins 12, extending in a horizontal position from one side thereof. These pins are adapted to alternately come in contact with operating finger 13 of the master switch 14, as hereinafter described.

As shown in Figure 8, a highway 15 crosses the railroad track 16, and at opposite sides of track 16, contiguous to the highway 15, I place two of my gate apparatus, but as each is similarly constructed, I am only describing specifically one apparatus. Two sets of track switch casings 17 are located at each side of the track, whereby the two track or ratchet switches 18 in each casing 17 are operated practically at the same time. These switches 18 are of the ordinary standard ratchet type switches, whereby a quarter turn will close or open a circuit.

A train or locomotive provided with striker bar 19 approaches for instance over the end A of the track 16; the striker bar 19 enters the slot 20 of casing 17, at end A of said track, and said bar engages lever 21 of each switch 18, throwing the switch a quarter turn, and as the striker bar passes out of casing 17, the levers 21 of said switches 18 will be returned to their normal set position (Fig. 3) by coil springs 22; these springs 22 attach at their outer ends to the casing in any suitable manner, and their other ends are fastened to the levers 21. When the locomotive or train (not shown) carrying the striker bar 19 passes the "outer" casing 17 and its switches, the closing of the circuits by the quarter turn or rotation of switches 18 will result in the motors 9 being thrown in circuit, whereby the two gates 4 will be lowered across the highway 15. Then, when the locomotive or train passes the "inner" casing 17 on the side of the railroad as the casing 17 at the end A, the striker bar 19 will have caused the switches in this "inner casing" to have moved a quarter turn, which causes the motors 9 to be reversed, thereby resulting in the gates 4 being raised.

Figure 1:
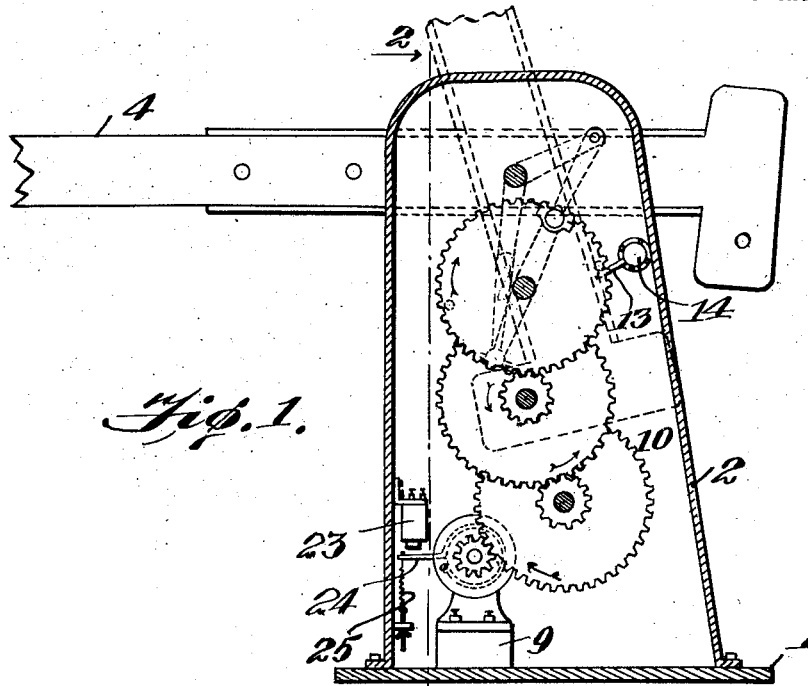
Figure 1 is a vertical sectional view of the gate casing, showing the electric motor and gearing for moving the gate to a closed or an open position.

I have provided an electromagnet 23 (Fig. 1), which when energized will lift the brake arm 24, releasing the motor 9, whereas when no current is flowing through the electromagnet 23, the power of the spring 25 is sufficient to hold arm 24 tightly clamped against the motor for braking the same. Any suitable type of a braking mechanism may be used, but I have illustrated in a general way merely the parts 23, 24 and 25.

The master switch 14 will stop the motor 9 at the proper time, so that the gate 4 is in a correct horizontal, closed position or is in a vertical open position. When the motor is started by the train closing the circuit, through the medium of the switch in the outer casing 17, the gears continue to rotate until one of the pins 12 comes in contact with the operating finger 13 of said master switch 14, whereby said switch is turned one quarter, breaking the circuit, not only of the motor but of the electromagnet 23, whereupon the motor is positively stopped by the brake being applied by spring 25. Then, when the train passes by the companion track casing, and through the striker bar 19, operates the ratchet switches therein, the circuit is closed with the motor 9 and electromagnet 23, resulting in the motor reversing its polarity and the brake being removed, by arm 24 being drawn upward, permitting the motor to operate the train of gears in a reverse manner, resulting in the gate being raised until the other pin 12 contacts with the operating finger 13 of switch 14, whereupon the circuit is broken, the motor stopped and the brake applied.

In Figure 8, I have shown a general wiring of one complete gate apparatus, whereas the other gate apparatus has its wiring in a single cable 26; in Figures 3 and 4, the wiring to the common type switches in casing 17 are also included by the cables 26.

Any number of trains can pass over the track 16, going in different directions, yet the set of gate apparatus, at the highway 15, will be operated efficiently, irrespective as to the direction the train is taking over the track, because the placing of a pair of casings 17 at each side of the track, and the casings in each pair at opposite sides of the highway, makes it possible to operate the two gates, by the train passing over the track, both to close the gates and then to raise the gates, as desired.

While I have described the preferred embodiment of my invention and illustrated the same in the accompanying drawings, certain minor changes or alterations may appear to one skilled in the art to which this invention relates during the extensive manufacture of the same, and I, therefore, reserve the right to make such changes or alterations as shall fairly fall within the scope of the appended claims.

It is to be understood that a one-way motor will operate the gate as well as a reversible motor.

What I claim is:

1. In an apparatus of the class described, the combination with a gate casing, of an oscillating, driven shaft journalled upon said casing, a crank shaft journalled upon said casing, an arm secured to said driven shaft, means pivotally connecting said arm to said crank shaft, a gate fixedly secured to said driven shaft, a ratchet switch provided with an operating finger on said gate casing, said crank shaft provided with means engaging said operating finger for actuating said switch, and means for rotating said crank shaft.

2. In an apparatus of the class described, the combination with a gate casing, a driven shaft on said gate casing, a gate fixedly secured to said driven shaft, of a crank shaft journalled on said gate casing, said crank shaft provided with a crank portion outside of said casing, an arm fixedly secured at its inner end to said driven shaft and being bifurcated at its outer end, a link pivotally connected at one end to said crank portion and pivotally connected at its other end to said bifurcated end of said arm, a disc fixedly secured to said crank shaft within said casing, said disc provided with a pair of horizontally-extending pins, a switch provided with an operating finger fastened to the inside of said gate casing, said pins of the disc adapted to alternately engage said operating finger, and electrical means for rotating said crank shaft.

In testimony whereof I hereunto affix my signature.

RALPH O. DORGAN.